(12) United States Patent
Householder

(10) Patent No.: US 9,982,983 B1
(45) Date of Patent: May 29, 2018

(54) HYDROGEN-PROPELLED BULLET AND A METHOD OF MAKING THEREOF

(71) Applicant: Melvin E. Householder, Shavano Park, TX (US)

(72) Inventor: Melvin E. Householder, Shavano Park, TX (US)

( * ) Notice: Subject to any disclaimer, the term of this patent is extended or adjusted under 35 U.S.C. 154(b) by 0 days. days.

(21) Appl. No.: 15/424,521

(22) Filed: Feb. 3, 2017

(51) Int. Cl.
  *F42B 33/02*  (2006.01)
  *C01B 3/04*  (2006.01)

(52) U.S. Cl.
  CPC .......... *F42B 33/0207* (2013.01); *C01B 3/042* (2013.01); *F42B 33/0292* (2013.01)

(58) Field of Classification Search
  CPC .................. F42B 33/0207; F42B 33/0292
  USPC ................................. 86/29–31, 47
  See application file for complete search history.

(56) References Cited

U.S. PATENT DOCUMENTS

| | | | | |
|---|---|---|---|---|
| 2,885,277 | A * | 5/1959 | Fitzpatrick | C06B 33/00 149/37 |
| 5,107,768 | A | 4/1992 | Langenohl | |
| 5,470,104 | A * | 11/1995 | Smith | B60R 21/272 222/5 |
| 5,531,473 | A * | 7/1996 | Rink | B60R 21/272 149/83 |
| 6,124,563 | A * | 9/2000 | Witherspoon | C23C 4/12 219/121.47 |
| 7,052,658 | B2 | 5/2006 | Arthur et al. | |
| D546,657 | S | 7/2007 | Buening | |
| 9,080,841 | B1 | 7/2015 | Nechitailo | |
| 9,341,456 | B2 | 5/2016 | Mohler et al. | |
| 9,377,278 | B2 | 6/2016 | Rubin | |
| 2004/0146754 | A1 * | 7/2004 | Arthur | B01J 7/00 422/198 |
| 2014/0261045 | A1 * | 9/2014 | Scott | F42B 12/36 102/502 |
| 2016/0015499 | A1 * | 1/2016 | Scott | F42B 7/08 604/130 |

FOREIGN PATENT DOCUMENTS

EP          295136 A1   12/1988

* cited by examiner

*Primary Examiner* — Samir Abdosh
(74) *Attorney, Agent, or Firm* — Plager Schack LLP

(57) ABSTRACT

A hydrogen-propelled projectile for using with a firearm eliminates cleaning the firearm and a method of making the projectile eliminates storing explosive propellant. The projectile has a cylindrical brass body closed at top and sealed at bottom with a primer and a brass seal. When the projectile is used with the firearm, the primer ignites hydrogen in the presence of oxygen, producing water vapor and energy that propels projectile toward a target. To make the projectile a salt water solution is electrolyzed to produce hydrogen and oxygen. A mixture of hydrogen and oxygen is then fed to a loader. The loader fills up the projectile, attached at a gas outlet, with gas by exerting pressure on gas using a load piston and channeling gas to the projectile. Finally, the loader seals the projectile with the primer by pressing a primer ram and affixing the primer at bottom of the projectile.

11 Claims, 4 Drawing Sheets

HYDROGEN-PROPELLED BULLET AND A METHOD OF MAKING THEREOF

BACKGROUND

The embodiments herein relate generally to a hydrogen-propelled bullet that uses hydrogen gas as a propellant and a method of making thereof. The hydrogen-propelled bullet does not produce soot inside a firearm due to quick and efficient combustion of hydrogen by a primer to produce energy and water vapor. Thus, using said bullet keeps the firearm clean and eliminates damage to inside of a barrel. Further, hydrogen can be produced on demand by electrolysis of salt water thus eliminates need for storing an explosive, making a safe propellant. Furthermore, a muzzle velocity can be manipulated by adjusting the density of hydrogen in the bullet.

Prior to this invention, a bullet used gunpowder as a propellant that required regular cleaning of a firearm due to inefficient combustion of gunpowder to gas which, in turn, causes a thick layer of soot inside the barrel of the firearm. Further, the deposited soot comprises hygroscopic potassium oxides or sodium hydroxide that turns into corrosive potassium hydroxide or sodium after absorption of moisture from air, further corroding the barrel. Furthermore, using gunpowder as the propellant required storing of explosive that can compromise safety of a user.

SUMMARY

A hydrogen-propelled projectile for using with a firearm eliminates cleaning the firearm and a method of making the projectile eliminates storing explosive propellant. The projectile has a cylindrical brass body closed at top and sealed at bottom with a primer and a brass seal. When the projectile is used with the firearm, the primer ignites hydrogen in the presence of oxygen, producing water vapor and energy that propels projectile toward a target. To make the projectile a salt water solution is electrolyzed to produce hydrogen and oxygen. A mixture of hydrogen and oxygen is then fed to a loader. The loader fills up the projectile, attached at a gas outlet, with gas by exerting pressure on gas using a load piston and channeling gas to the projectile. Finally, the loader seals the projectile with the primer by pressing a primer ram and affixing the primer at bottom of the projectile.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
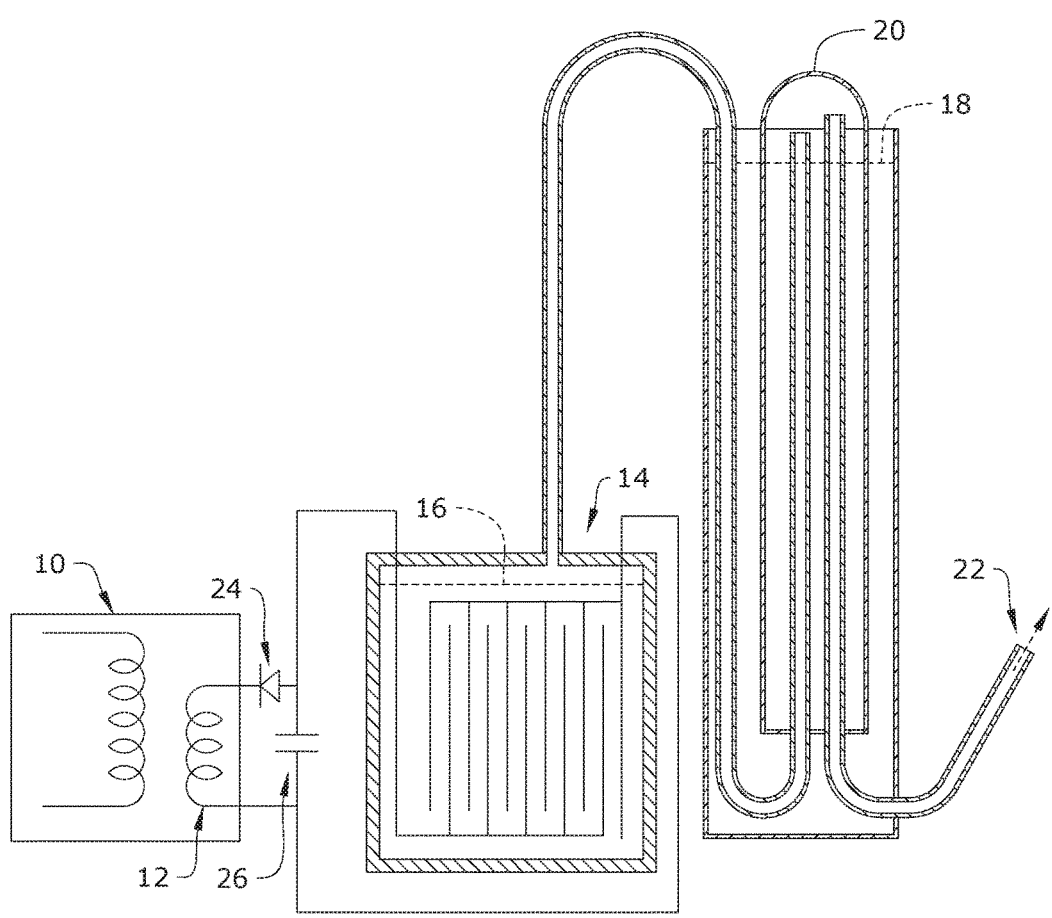
FIG. 1 shows a schematic view of one embodiment of the present invention.
Figure 2:
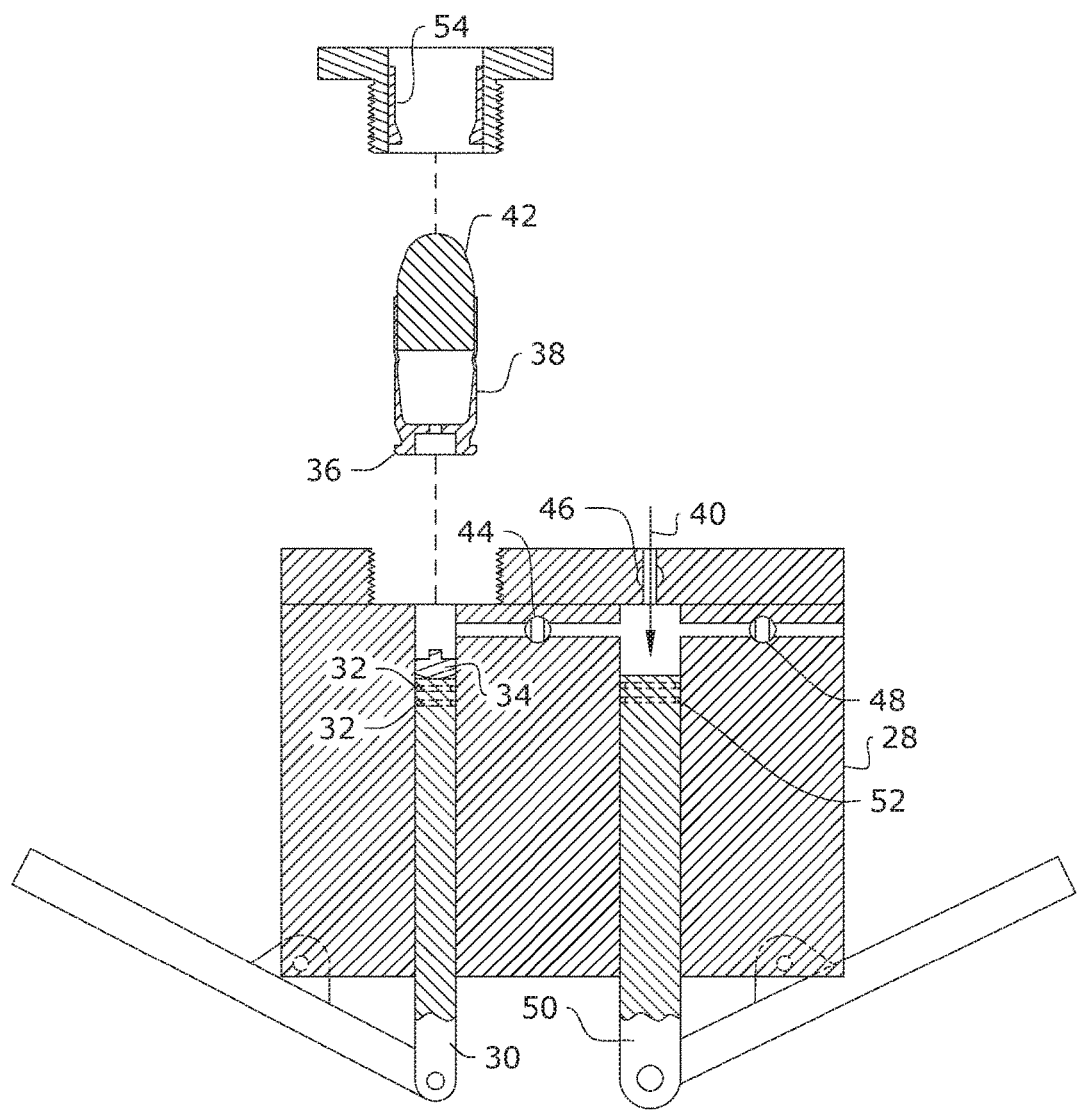
FIG. 2 shows a schematic and section view of the invention demonstrating casing placement.
Figure 3:
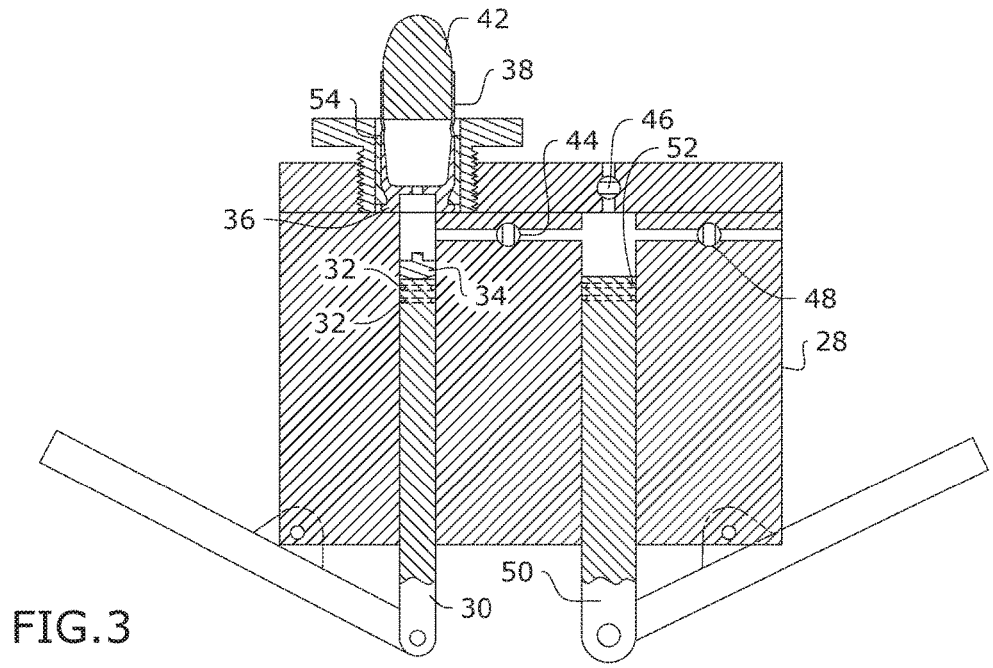
FIG. 3 shows a schematic and section view of the invention demonstrating casing placement.
Figure 4:
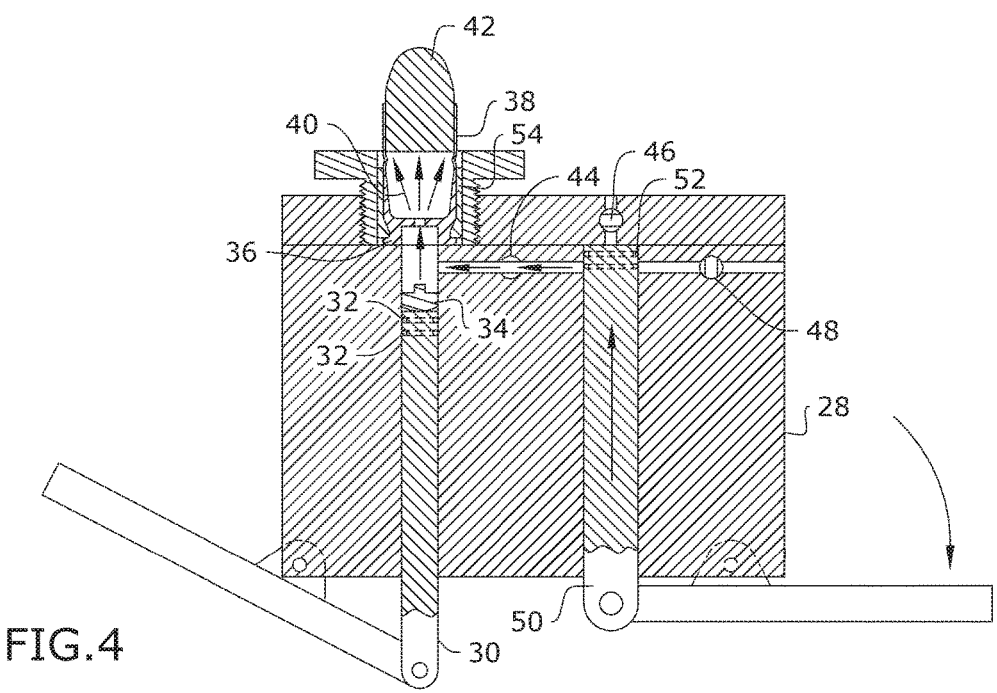
FIG. 4 shows a schematic and section view of the invention demonstrating gas insertion.
Figure 5:
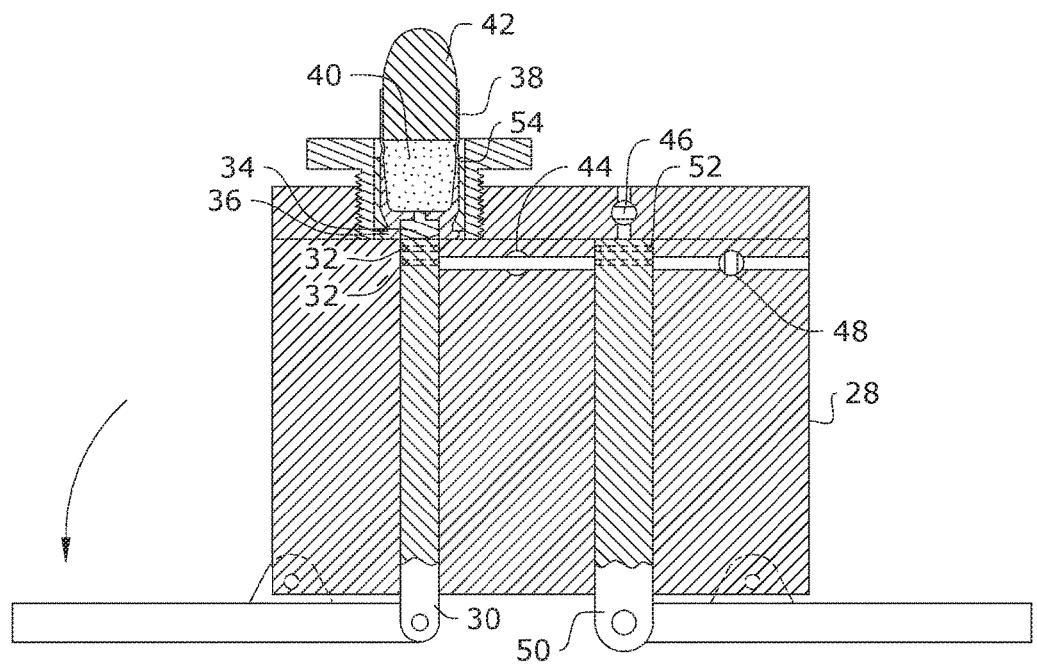
FIG. 5 shows a schematic and section view of the invention demonstrating primer insertion.
Figure 6:
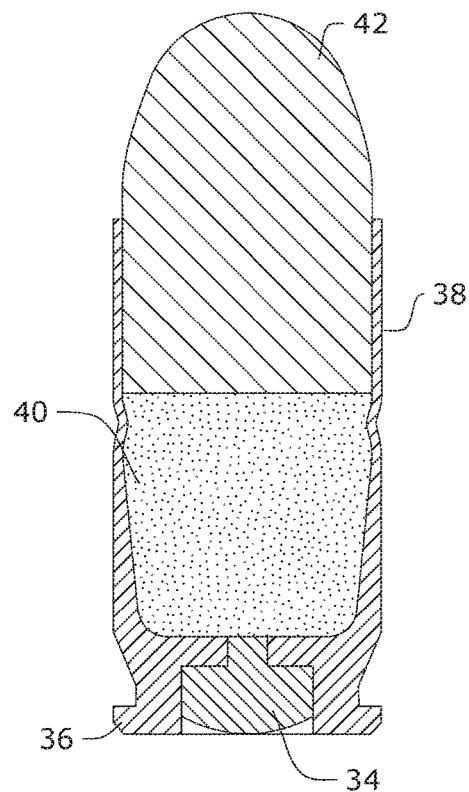
FIG. 6 shows a section view of the bullet.

By way of example, and referring to FIGS. 1-6, one embodiment of the present system comprises a hydrogen generator that is connected a loader for loading the hydrogen into a bullet as a propellant, inserting a primer and sealing the bullet with a sealant.

The hydrogen generator 14 electrolyzes a salt water 16 to produce hydrogen gas by transferring electricity through solution, wherein salt acts as an electrolyte, conducting electricity through solution. The generator further comprising a transformer 10, generating electricity and transferring to a diode rectifier 24 that converts alternating current to direct current and then transfers to salt water solution via a capacitor 26. The capacitor stores electric energy and ensures a continuous supply of electricity for electrolysis. Finally, a step voltage 12 is also connected between the diode and the capacitor for providing grounding to the generator. The electrolysis of salt water produces hydrogen and chlorine gases by reduction and oxidation, respectively. The overall chemical reaction is shown by the following equation:

$$2NaCl + 2H_2O \rightarrow 2NaOH + H_2 \text{ (gas)} + Cl_2 \text{ (gas)}$$

Though production chlorine is thermodynamically favored than production of oxygen due to oxidation of water, a small amount of oxygen may be formed shown as follows:

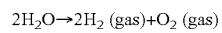
$$2H_2O \rightarrow 2H_2 \text{ (gas)} + O_2 \text{ (gas)}$$

Thus, a mixture of hydrogen and oxygen is produced with higher concentration of hydrogen and final concentration of hydrogen between 4 and 75%. The mixture of hydrogen and oxygen is collected by a gas separator tubing 20 passing through a column of a fresh water 18, with one end connected to the hydrogen generator for collecting the mixture of hydrogen and oxygen and other end, a hydrogen-oxygen output to loader 22, connected to a loader 28 at a gas inlet 40.

The loader prepares a projectile 42 by filing up with a mixture of hydrogen and oxygen and then inserting a primer 34 at bottom of the projectile to seal the projectile. The loader has a loader side with a loading chamber 60 and a piston side with a piston chamber 62 on opposite ends. There is a transition chamber 64 between the loading chamber 60 and the piston chamber 62

The loader side further includes the gas inlet and a gas outlet, placed next to each other and are also connected to each other by a load valve 44 regulated tube. The piston side includes a load piston 50 and a primer ram 30 functionally coupled to the gas inlet and the gas outlet, respectively. Flow of gas within the loader is regulated by a plurality of ball valves. For example, flow into an input chamber 60 in the loader is regulated by a hydrogen gas valve 46, flow towards the gas outlet is regulated by the load valve while flow in an opposite tubing is regulated by an air dump valve 48, and finally flow towards the load piston is regulated by a plurality of piston seals 52 placed between the gas outlet and the load piston. Further, the gas outlet is sealed by a plurality of O-ring seals 32, avoiding gas from entering the primer ram. The O-rings towards the gas outlet also holds the primer configured to fit bottom of the projectile.

To use the loader, first a casing is attached to the loader by placing in the gas outlet that is configured to receive the casing. The projectile is then attached to the gas outlet such that a plurality of extractor clips 54 on the casing securely holds a cylindrical brass body 38 of the projectile and a brass seal 36 at bottom of the projectile. Once the casing and the projectile are placed and the chamber is filled with mixture of hydrogen-oxygen gas, the hydrogen gas valve and the air dump valve are closed while the load valve is opened by the pressure exerted by pressing the load piston away from the loader side. This allows the gas to flow towards the gas outlet and into the projectile. Once density of the gas in the projectile required for desired muzzle velocity is achieved, the projectile is sealed by the primer. In some embodiments, the hydrogen and oxygen mixture will be between 0 psig and 29.4 psig. The primer is placed by pressing the primer ram away from the loader side, to be perpendicular to the loader. This exerts force that attaches the primer to bottom of the projectile and seals the projectile.

To use the projectile, the projectile is loaded in a firearm and when triggered, the primer causes exothermic combustion of hydrogen gas in the presence of oxygen. Energy from the combustion then propels the projectile towards a target. To manufacture the loader, projectile and the primer, automated machineries and various materials can be used.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶ 6. In particular, any use of "step of" in the claims is not intended to invoke the provision of 35 U.S.C. § 112, ¶ 6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A projectile loading machine, configured to load a mixture of hydrogen and oxygen into a hydrogen-propelled projectile; the projectile loading machine comprising:
    a loader, mechanically coupled to a source of the mixture of hydrogen and oxygen with a hydrogen gas valve;
    an input chamber, connected to the hydrogen gas valve and a load piston with a plurality of piston seals;
    a transition chamber, connected to the input chamber, a load valve, connected to the transition chamber and to a loading chamber;
    a primer ram, arranged within the loading chamber with a plurality of O-ring seals;
    a primer, connected to the primer ram;
    a projectile having a cylindrical body closed at top while bottom sealed with the primer in center and with a brass seal surrounding the primer, wherein the projectile is filled with a propellant that is a mixture of hydrogen and oxygen under pressure from the loading chamber.

2. The projectile loading machine of claim 1, further comprising a plurality of extractor clips connected to the cylindrical body and mated to the loader with threads.

3. The projectile loading machine of claim 2, further comprising an ambient air release, connected to the transition chamber with an air dump valve.

4. The projectile loading machine of claim 3, wherein the mixture of hydrogen and oxygen has a molar ratio of 4:1 hydrogen to oxygen.

5. The projectile loading machine of claim 4, wherein the mixture of hydrogen and oxygen is pressurized at 14.7 psig.

6. A method of making a hydrogen-propelled projectile filled with hydrogen as a propellant that eliminates storing explosive propellant, comprising the steps of:
    electrolyzing a salt water solution to produce hydrogen and oxygen at a hydrogen-oxygen output to loader using a hydrogen generator;
    connecting the hydrogen-oxygen output to a gas inlet on a loader, having a loader side with the gas inlet and a gas outlet and a piston side with a load piston and a primer ram functionally coupled to the gas inlet and the gas outlet, respectively,
    wherein flow of gas within the loader is regulated by a plurality of valves to regulate flow from the gas inlet towards a chamber, flow towards the gas outlet from the gas inlet and flow away from the gas outlet while flow of gas is prevented towards the load piston and the primer ram by a plurality of seals;
    attaching a casing to the gas outlet and securely holding the brass cylindrical body and the brass seal of the projectile by a plurality of extractor clips and;
    attaching the projectile to the gas outlet within the casing,
    wherein to fill the projectile by gas, first gas is channeled towards the gas outlet from the gas inlet by opening the valve towards the gas outlet and closing the valves away from the outlet, then attaching the casing and the projectile to the gas outlet, then pressing the load piston followed by the primer ram that exerts force on gas to fill up the projectile and seal said projectile with a primer.

7. The method of making the hydrogen-propelled projectile of claim 6, wherein the hydrogen generator electrolyzes the salt water solution by supplying electricity using a circuit with a transformer, a diode rectifier, a capacitor and a step voltage.

8. The method of making the hydrogen-propelled projectile of claim 6, wherein the hydrogen generator produces mixture of hydrogen and oxygen with higher molar ratio between hydrogen and oxygen and with hydrogen gas having concentration between 4 and 75%.

9. The method of making the hydrogen-propelled projectile of claim 6, wherein the hydrogen generator is equipped with a gas separator tubing embedded in a water column for carrying hydrogen and oxygen to the loader through the hydrogen-oxygen output to loader.

10. The method of making the hydrogen-propelled projectile of claim 6, wherein the valves in the loader, regulating flow of gas, are ball valves.

11. The method of making the hydrogen-propelled projectile of claim 6, wherein the seals in the primer ram comprise a plurality of O-ring seals that also hold the primer, facing the gas outlet.

\* \* \* \* \*